United States Patent [19]
Abler

[11] Patent Number: 5,344,626
[45] Date of Patent: Sep. 6, 1994

[54] DUAL IMPREGNATED ACTIVATED CARBON

[75] Inventor: Mary Jo Abler, St. Paul, Minn.

[73] Assignee: Minnesota Mining and Manufacturing Company, St. Paul, Minn.

[21] Appl. No.: 904,994

[22] Filed: Jun. 26, 1992

[51] Int. Cl.$^5$ .............................................. C01B 31/08
[52] U.S. Cl. ................................. 423/210; 502/180; 502/184; 502/185
[58] Field of Search .................. 502/180, 184, 185; 423/210, 238, 236

[56] References Cited

U.S. PATENT DOCUMENTS

| | | | |
|---|---|---|---|
| 2,528,517 | 11/1950 | Hormats | 252/431 |
| 4,072,480 | 2/1978 | Wagner | 55/73 |
| 4,482,641 | 11/1984 | Wennerberg | 502/182 |
| 4,532,115 | 7/1985 | Nishino et al. | 423/210 |
| 4,594,231 | 6/1986 | Nishino et al. | 423/210 |
| 4,656,154 | 4/1987 | Drake | 502/185 |
| 4,661,466 | 4/1987 | Drake et al. | 502/184 |
| 4,992,404 | 2/1991 | Gruhl et al. | 502/185 |
| 5,202,301 | 4/1993 | McNamara | 502/417 |
| 5,232,886 | 8/1993 | Yoshimoto et al. | 502/84 |

FOREIGN PATENT DOCUMENTS

| | | |
|---|---|---|
| 175003 | 11/1978 | Czechoslovakia . |
| 1087579 | 8/1960 | Fed. Rep. of Germany . |
| 3805407A1 | 8/1989 | Fed. Rep. of Germany ........... B01J 23/84 |
| 195436 | 5/1984 | Hungary . |
| 60-820 | 1/1985 | Japan .................................... 423/210 |
| 62-193633 | 8/1987 | Japan .................................... 423/236 |
| 2187725 | 9/1987 | United Kingdom . |

OTHER PUBLICATIONS

Derwent Publication AN86-107,061 & DD, A231,328 (Dec. 24, 1985).
Derwent Publication An 84-160680 & HV, A 31,569 (May 28, 1984).
Chem. Abstracts, vol. 90, No. 26 (Jun. 25, 1979).
Copy of European Search Report dated Oct. 29, 1993.
Alder et al., *The Adsorption of Hydrogen Cyanide by Activated Carbon Cloth*, Carbon, vol. 26, No. 5, pp. 701–711, 713–721 (1988).

*Primary Examiner*—Gary P. Straub
*Assistant Examiner*—Timothy C. Vanoy
*Attorney, Agent, or Firm*—Gary L. Griswold; Walter N. Kirn; Karl G. Hanson

[57] ABSTRACT

A dual-impregnated activated carbon composition includes activated carbon impregnated with a Group 6–12 metal salt and a Group 1 metal carbonate salt, where the molar ratio on the activate carbon of the Group 1 metal to the Group 6–12 metal is 1 or greater. The dual-impregnated activated carbon composition is particularly suitable for filtering gaseous contaminants.

17 Claims, No Drawings

DUAL IMPREGNATED ACTIVATED CARBON

TECHNICAL FIELD

This invention pertains to chemically-treated activated carbon that has been impregnated with a Group 6–12 metal salt and a Group 1 metal carbonate salt.

BACKGROUND OF THE INVENTION

Activated carbon has been commonly used as a sorbent for removing gaseous contaminants from air. In many known activated carbon compositions, the activated carbon is impregnated with a metal or metal salt, which assists in removing a gaseous contaminant from the air. For example, it has been disclosed that hydrogen cyanide (HCN) can be removed from air by impregnating an activated carbon cloth with a metal carbonate salt that contains divalent cations of manganese, cobalt, nickel, copper, and zinc (see Alder et al., The Adsorption of Hydrogen Cyanide by Activated Carbon Cloth, Carbon, v. 26, n. 5, pp. 701–711, 713–721 (1988); see also UK Patent Application GB 2,187,725). It also has been disclosed that activated carbon can be (i) treated with a salt that has a coefficient of solubility greater than $1 \times 10^{-2}$ grams per gram of water (for example, a nitrate, sulfate, tartrate, acetate, or chloride salts that contain cations of zinc, cadmium, copper, nickel, silver, cobalt, or barium), (ii) dried, (iii) treated with a metal salt that can be sodium or potassium carbonate, vanadate, chromate, tungstenate, permanganate, and molybdenate, and (iv) then washed thoroughly with excess water (see Czechoslovakian Patent 175,003).

SUMMARY OF THE INVENTION

This invention provides a dual-impregnated activated carbon composition that is capable of removing gaseous contaminants from a gaseous mixture such as air. The composition comprises activated carbon impregnated with at least one first metal salt and at least one second metal salt. The first metal salt(s) contains a metal from Groups 6–12 of the periodic table (using the new International Union of Pure and Applied Chemistry (IUPAC) notation issued by the Commission on the Nomenclature of Inorganic Chemistry in 1988). The second metal salt is a metal carbonate salt that contains a Group 1 metal. The molar ratio on the activated carbon of the metal(s) of the second metal salt(s) to the metal(s) of the first metal salt(s) is about 1 or greater.

This invention also provides a method of making a composition capable of removing gaseous contaminants from a gaseous mixture such as air. The method comprises:

(a) impregnating activated carbon with at least one first metal salt that contains a metal from Groups 6–12; and (b) impregnating the activated carbon with at least one second metal salt that is a metal carbonate that contains a Group 1 metal;

wherein the first and second metal salts are impregnated on the activated carbon such that a molar ratio of the metal(s) of the second metal salt(s) to the metal(s) of the first metal salt(s) is about 1 or greater.

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

In the practice of this invention, any activated carbon suitable for impregnation with a Group 6–12 metal salt and Group 1 metal carbonate salt may be used. As the term is used herein, "activated carbon" means a carbonaceous material having a porosity that provides a surface area in the range of 300 to 3,000 square meters per gram ($m^2/g$) when measured according to Brunaver, Emmett, and Teller (BET) test method (see D. M. Ruthven, Principles of Adsorption and Adsorption Process, pp. 52–54, John Wiley (1984)). The term "impregnate" means to cause a metal salt to permeate the activated carbon to become held on a surface of the activated carbon. Preferred activated carbon has a surface area in the range of 700 to 1500 $m^2/g$. The activated carbon can come in a variety of shapes and compositions; for example, activated carbon granules or pellets may be used, as well as activated carbon fibers and cloths. The activated carbon may be derived from many carbon-based materials including wood, coal, coconut, organic polymers, etc.

The Group 6–12 metal salt contains a group 6–12 metal and at least one anionic species. Group 6–12 metals that can provide particularly good filtration performance when impregnated on activated carbon as part of a metal salt include (but are not limited to) chromium, manganese, cobalt, nickel, copper, zinc, and cadmium. From a performance standpoint, zinc is the preferred Group 6–12 metal. The Group 6–12 metal typically is used in its +2 oxidation state.

There are a variety of organic and inorganic anionic species that may be employed in the Group 6–12 metal salt. Examples of organic anionic species may include (but are not limited to) carboxylic acid derivatives such as acetate, formate, propanate; substituted carboxylic acid derivatives including halogen-substituted carboxylic acid derivatives such as chloro-substituted acetates, proponates and the like; and carboxyl containing ligands. Examples of inorganic anionic species include conjugate bases of inorganic acids, preferably strong inorganic acids, for example, sulfates, nitrates, and halides such as chloride.

Examples of Group 6–12 metal salts may include (but are not limited to) zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc proponate, copper proponate, nickel proponate, cobalt proponate, iron propanate, manganese proponate, cadmium proponate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, zinc sulfate, copper sulfate, nickel sulfate, cobalt sulfate, iron sulfate, manganese sulfate, cadmium sulfate, and the like. Preferred Group 6–12 metal salts include zinc acetate, copper acetate, cadmium acetate, cobalt acetate, cobalt chloride, zinc chloride, zinc sulfate, copper sulfate, manganese acetate, cobalt formate, cobalt chloro acetate, and cobalt dichloroacetate. Combinations of Group 6–12 metal salts may also be employed.

The Group 6–12 metal(s) preferably is present on the activated carbon at at least 0.5 weight percent based on the weight of dried dual-impregnated activated carbon. The term "dried" is used herein to mean that less than 2 weight percent water is present on the activated carbon. More preferably, the Group 6–12 metal(s) is present in the range of 1 to 10 weight percent, and more preferably in the range of 2 to 7 weight percent, based on the weight of dried dual-impregnated activated carbon.

The Group 1 metal carbonate salt contains a Group 1 metal and a carbonate substituent. Preferred Group 1 metal carbonate salts are soluble in aqueous or organic solvents, and more preferred Group 1 metal carbonate salts are soluble in water. By "soluble" is meant 0.1 weight percent of the metal carbonate salt remains in solution at 25° C. and 1 atmosphere pressure. Potassium carbonate and rubidium carbonate are preferred Group 1 metal salts because they have good solubility in water and are relatively inexpensive. Combinations of Group 1 metal carbonate salts may also be impregnated on the activated carbon; for example, sodium carbonate and potassium carbonate may be jointly impregnated on the activated carbon.

The Group 1 metal(s) of the metal carbonate salt(s) preferably is present on the dual-impregnated activated carbon at at least 1 weight percent based on the weight of dried dual-impregnated activated carbon. More preferably, the Group 1 metal(s) is present on dried dual-impregnated activated carbon at at least 2.5 weight percent. Typically, the Group 1 metal(s) is present on the dual-impregnated activated carbon at less than 20 weight percent, more typically less than 10 weight percent, based on the weight of dried dual-impregnated activated carbon.

The molar ratio on the activated carbon of the Group 1 metal(s) to the Group 6–12 metal(s) is 1 or greater, and preferably is in the range of 2 to 15. The combined weight percent of the Group 6–12 and Group 1 metals on the activated carbon, in general, is greater than 1.5 weight percent based on the weight of dried dual-impregnated activated carbon. Preferably, the combined weight percent of the Group 6–12 and Group 1 metals is greater than 3.5 weight percent. At the upper end, the combined total weight percent of the Group 6–12 and Group 1 metals typically is less than 40 weight percent, more typically less than 20 weight percent, based on the weight of the dual-impregnated activated carbon.

The activated carbon preferably is treated in sequence, first with a Group 6–12 metal salt(s) and then with a Group 1 metal carbonate salt(s). In each treatment, an effective amount of the Group 6–12 metal salt(s) and the Group 1 metal carbonate salt(s) are impregnated onto the activated carbon. By "an effective amount" is meant an amount sufficient to enhance the removal of a gaseous contaminant.

The activated carbon may be impregnated with the Group 6–12 and Group 1 metal salts by, for example, soaking the activated carbon in solutions containing the respective metal salts. The activated carbon can be first soaked in a solution that contains a Group 6–12 metal salt, and then it can be soaked in a solution that contains a Group 1 metal carbonate salt. The soaking can be performed by, for example, immersing the activated carbon in the respective metal salt solution. In general, the first solution contains about 3 to 30 weight percent of a Group 6–12 metal salt, more typically 5 to 20 weight percent, based on the combined weight of the metal salt and solvent. The second solution, in general, contains about 3 to 50 weight percent of a Group 1 metal carbonate salt, more typically 10 to 30 weight percent, based on the combined weight of the metal carbonate salt and solvent. The activated carbon is soaked in each solution for a time sufficient to allow the Group 6–12 metal salt(s) or the Group 1 metal carbonate salt(s) to permeate the activated carbon so that sufficient impregnation takes place on the activated carbon. The soaking time may vary depending on such factors as the solvent used and the form of the activated carbon, but in general is from about 10 to 60 minutes. Water is a preferred solvent for use in impregnating the activated carbon with the Group 6–12 metal salt(s) and the Group 1 metal carbonate salt(s) because water is environmentally friendly and is readily available.

As an alternative to soaking the activated carbon in the metal salt solutions, spraying techniques may be employed where the respective solutions are sprayed onto the activated carbon to impregnate the metal salts thereto.

Although the activated carbon can be dried after each impregnation, it is preferred that the activated carbon only be dried after the final impregnation. Drying may require further handling of the activated carbon, which, in turn, may cause abrasion that detrimentally affects the performance of the impregnated activated carbon. Thus, the number of drying steps is desirably kept to a minimum. Drying after the final impregnation is desired, however, because it can improve organic contaminant service lifes. After being impregnated, the activated carbon preferably is not washed with water or other solvents, as such washing steps may remove the second metal salt (for example, potassium carbonate) to provide a low ratio of the Group 1 metal(s) to the Group 6–12 metal(s).

After the dual impregnation, and preferably after drying, the dual-impregnated activated carbon composition can be used to remove gaseous contaminants from fluids such as air. The gaseous contaminants that can be removed include inorganic gases such as HCN, hydrogen halide gases including HF and HCl, hydrogen sulfide, and halogen gases including chlorine and bromine, and acid gases such as sulfur dioxide.

Objects, features, and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

EXAMPLES

In the following Examples, the activated carbon was tested for filtering service life according to the Comité Européen de Normalisation (CEN) testing procedure, following EN 141, class 1 standards. The flow rate specified in the EN 141, class 1 standards was doubled in the HCN service life tests, however, to accelerate the service life test. The notation "Ac" is used in the following Examples to represent an acetate ligand $CH_3CO_2^-$, and "Fm" is used to represent a formate ligand $HCOO^-$.

EXAMPLE 1

Comparative—Non-Impregnated Activated Carbon

A 105 cubic centimeter (cm³) volume of a coconut-based activated carbon (GC 16×35 mesh available from Kurarary Chemical Company, Osaka) was tested for HCN service life. The results of this test are reported in Table 1.

EXAMPLE 2

Comparative—Impregnated Only with $Zn(CH_3CO_2)_2$

A 1000 g solution of 11 weight percent zinc acetate in water was made by dissolving 131.5 g of zinc acetate dihydrate in 868.5 g water. The activated carbon of Example 1 (504 g) was added to the solution, soaked for 40 minutes, and was filtered using a buchner funnel. The activated carbon was then placed in an oven set at 100° C. and was dried until the percent water on the carbon was approximately 2 percent. During the first half hour of drying, the carbon was frequently stirred.

EXAMPLE 3

Comparative—Impregnated Only with $K_2CO_3$

The activated carbon of Example 1 (504 g) was added to a 23 weight percent solution of potassium carbonate in water, which had been made by dissolving 345 g of potassium carbonate in 1155 g of water. The activated carbon was allowed to soak for 40 minutes, at which time the carbon was filtered using a buchner funnel. The activated carbon was then placed in an oven set at 100° C. and was dried until the percent water on the carbon was approximately 2 weight percent. During the first half hour of drying, the carbon was frequently stirred.

EXAMPLES 4–5

Comparative—Activated Carbon Blend and Laminate

In Example 4, a sample was tested that was a 50:50 blend by volume of the treated activated carbon of Example 2 and the treated activated carbon of Example 3. In Example 5, the activated carbon of Examples 2 and 3 were layered upon each other in equal amounts by volume.

EXAMPLE 6

Dual Impregnation

The activated carbon of Example 1 was impregnated according to the procedure of Example 2 without drying and then was impregnated according to the procedure of Example 3.

TABLE 1

| Example | Group 6–12 Metal Salt | Group 1 Metal Carbonate Salt | First Solution Concentration (wt. %) | Second Solution Concentration (wt. %) | HCN Service Life (min.) |
|---|---|---|---|---|---|
| 1* | — | — | — | — | 3 |
| 2* | ZnAc₂ | — | 11 | — | 42 |
| 3* | — | K₂CO₃ | 23 | — | 11.5 |
| 4* | ZnAc₂ | K₂CO₃ | 11 | 23 | 32 |
| 5* | ZnAc₂ | K₂CO₃ | 11 | 23 | 27.5 |

TABLE 1-continued

| Example | Group 6–12 Metal Salt | Group 1 Metal Carbonate Salt | First Solution Concentration (wt. %) | Second Solution Concentration (wt. %) | HCN Service Life (min.) |
|---|---|---|---|---|---|
| 6 | ZnAc₂ | K₂CO₃ | 11 | 23 | 121 |

*Comparative Examples

The data set forth in Table 1 demonstrates that the dual-impregnated activated carbon of this invention (Example 6) performs superior to:

(1) non-impregnated activated carbon (Example 1);
(2) activated carbon impregnated only with a Group 6–12 metal salt (Example 2);
(3) activated carbon impregnated only with a Group 1 metal carbonate salt (Example 3);
(4) blends of (i) activated carbon impregnated only with a Group 6–12 metal salt and (ii) activated carbon impregnated only with a Group 1 metal carbonate salt (Example 4); and
(5) layered samples of (i) activated carbon impregnated only with a Group 6–12 metal salt and (ii) activated carbon impregnated only with a Group 1 metal carbonate salt (Example 5).

EXAMPLES 7–11

Comparative—Impregnated with Non-Carbonate Group 1 Metal Salts

The test samples were prepared as described in Example 6, except different Group 1 metal salts were used in the second treatment. The particular Group 1 metal salt and the amount employed in solution are shown below in Table 2.

EXAMPLE 12

Dual Impregnation

This sample was prepared as described in Example 6, except $Rb_2CO_3$ was used as the Group 1 metal carbonate salt.

TABLE 2

| Example | Group 6–12 Metal Salt | Group 1 Metal Carbonate Salt | First Solution Concentration (wt. %) | Second Solution Concentration (wt. %) | HCN Service Life (min.) |
|---|---|---|---|---|---|
| 7* | ZnAc₂ | KHCO₃ | 11 | 23 | 35.5 |
| 8* | ZnAc₂ | KOH | 11 | 23 | 29.5 |
| 9* | ZnAc₂ | KOH | 11 | 2 | 23 |
| 10* | ZnAc₂ | KOH | 11 | 0.20 | 25 |
| 11* | ZnAc₂ | K₃PO₄ | 11 | 23 | 28.5 |
| 12 | ZnAc₂ | Rb₂CO₃ | 11 | 23 | 81 |

*Comparative Examples

The data set forth in Table 2 shows that activated carbon impregnated with a Group 1 metal salt that is not a metal carbonate (Examples 7–11) does not perform as well as activated carbon that has been impregnated with a Group 1 metal carbonate salt (Example 12) according to this invention.

EXAMPLES 13–32

Dual-Impregnated and Single-Impregnated Activated Carbon

The test samples were prepared as described in Example 6 when a dual impregnation was provided. The single-impregnated comparative samples were prepared as described in Example 2. The metal salts and the amounts employed are shown below in Table 3.

TABLE 3

| Example | Group 6–12 Metal Salt | Group 1 Metal Carbonate Salt | First Solution Concentration (wt. %) | Second Solution Concentration (wt. %) | HCN Service Life (min.) |
|---|---|---|---|---|---|
| 13* | MnAc$_2$ | — | 11 | — | 2 |
| 14 | MnAc$_2$ | K$_2$CO$_3$ | 11 | 23 | 25 |
| 15* | CuAc$_2$ | — | 6 | — | 2 |
| 16 | CuAc$_2$ | K$_2$CO$_3$ | 6 | 23 | 63 |
| 17* | CdAc$_2$ | — | 11 | — | 23.5 |
| 18 | CdAc$_2$ | K$_2$CO$_3$ | 11 | 23 | 73 |
| 19* | CoAc$_2$ | — | 11 | — | 46 |
| 20 | CoAc$_2$ | K$_2$Co$_3$ | 11 | 23 | 91 |
| 21* | CoFm$_2$ | — | saturated | — | 10.5 |
| 22 | CoFm$_2$ | K$_2$CO$_3$ | saturated | 23 | 40.5 |
| 23* | Co(ClCH$_2$CO$_2$)$_2$ | — | 10 | — | 4.5 |
| 24 | Co(ClCH$_2$CO$_2$)$_2$ | K$_2$CO$_3$ | 10 | 23 | 63 |
| 25* | Co(Cl$_2$CHCO$_2$)$_2$ | — | 10 | 0 | 3 |
| 26 | Co(Cl$_2$CHCO$_2$)$_2$ | K$_2$CO$_3$ | 10 | 23 | 31.5 |
| 27* | CoCl$_2$ | — | 11 | — | 11 |
| 28 | CoCl$_2$ | K$_2$CO$_3$ | 11 | 23 | 113 |
| 29* | ZnCl$_2$ | — | 11 | — | 13 |
| 30 | ZnCl$_2$ | K$_2$CO$_3$ | 11 | 23 | 120 |
| 31* | ZnSO$_4$ | — | 11 | — | 4 |
| 32 | ZnSO$_4$ | K$_2$CO$_3$ | 11 | 23 | 73 |

*Comparative Examples

The data set forth in Table 3 demonstrates that the dual-impregnated activated carbon of this invention (even-numbered Examples) performs superior to the activated carbon impregnated only with a Group 6–12 metal salt (odd-numbered Examples).

EXAMPLES 33–43

Dual Impregnation

In these Examples the samples were analyzed for content of the metal of the Group 6–12 metal salt and content of the metal of the Group 1 metal carbonate salt. The analysis was performed by Inductively Coupled Plasma Spectroscopy (ICP). The molar ratios of the Group 1 metals to the Group 6–12 metals are shown in Table 4, along with HCN service life tests performed according to the procedure described in Example 1. Test sample 33 was prepared according to Example 6, and test samples 34–43 were prepared according to even-numbered Examples 12–30, respectively.

TABLE 4

| Example | Group 6–12 Metal | Ligand | Group 1 Metal | Molar Ratio Group 1 Metal: Group 6–12 Metal | HCN Service Life (Min.) |
|---|---|---|---|---|---|
| 33 | Zn | Ac | K | 2.76 | 121 |
| 34 | Zn | Ac | Rb | 1.17 | 81 |
| 35 | Mn | Ac | K | 2.55 | 25 |
| 36 | Cu | Ac | K | 3.85 | 63 |
| 37 | Cd | Ac | K | 2.97 | 73 |
| 38 | Co | Ac | K | 2.75 | 91 |
| 39 | Co | Fm | K | 11.68 | 40.5 |
| 40 | Co | ClCH$_2$CO$_2$ | K | 3.88 | 63 |
| 41 | Co | Cl$_2$CHCO$_2$ | K | 4.22 | 31.5 |
| 42 | Co | Cl | K | 2.92 | 113 |
| 43 | Zn | Cl | K | 2.33 | 120 |

The data set forth in Table 4 demonstrates that the activated carbon can be impregnated with a variety of Group 6–12 and Group 1 metal salts to provide good HCN service lifes.

EXAMPLES 44 AND 46

Dual Impregnation

Examples 44 and 46 were prepared as described in Example 6, except ZnSO$_4$ and CuSO$_4$ were used as the Group 6–12 metal salts, respectively.

EXAMPLES 45 AND 47

Comparative—Dual Impregnation

These Examples are reproductions of Examples 1 and 3 of Czechoslovakian Patent 175,003, respectively.

TABLE 5

| Example | Group 6–12 Metal | Ligand | Group 1 Metal | Molar Ratio Group 1 Metal: Group 6–12 Metal | HCN Service Life (Min.) |
|---|---|---|---|---|---|
| 44 | Zn | SO$_4$ | K | 4.5 | 73 |
| 45* | Zn | SO$_4$ | K | 0.77 | 59.5 |
| 46 | Cu | SO$_4$ | K | 4.06 | 59.5 |
| 47* | Cu | SO$_4$ | K | 0.38 | 20.5 |

*Comparative Examples

The data set forth in Table 5 demonstrates that dual-impregnated activated carbon of this invention (Examples 44 and 46) performs superior to the activated carbon of Czechoslovakian Patent 175,003 (Examples 45 and 47).

EXAMPLE 48

Dual Impregnation

In this Example, the test sample was prepared as described in Example 6 except Kuraray GC 12×35 mesh activated carbon was used. The test sample was tested for service life performance using the following challenges: CCl$_4$, SO$_2$, Cl$_2$, HCN, and HF. The CCl$_4$, SO$_2$, Cl$_2$, and HCN testing for service life was conducted in accordance with CEN EN 141, class 1 standards; however, the HCN test was performed at a doubled flow rate to accelerate the test. The HF service life testing was conducted according to NIOSH protocol (see C. Coffey et al., HF Test System for Cartridges, Air Purifying Respirator Section Test Procedure No.

39, Dept. Health & Hum. Serv. (Nov. 1989)). The service life test results are shown below in Table 6.

TABLE 6

| First Metal Salt Solution | Second Metal Salt | Challenge Vapor | Service Life (Min.) |
|---|---|---|---|
| 11 wt. % | 23 wt. % | $CCl_4$ | 126 |
|  |  | $SO_2$ | 105 |
|  |  | $Cl_2$ | 122 |
| $ZnAc_2$ | $K_2CO_3$ | HCN | 95 |
|  |  | HF | >170 |

The data in Table 6 demonstrates that the dual-impregnated activated carbon of this invention is suitable for removing a variety of gaseous contaminants from air.

EXAMPLES 49–73 AND 75–77

Dual Impregnation

The test samples of these Examples were prepared by the method of Example 6, except the activated carbon was dried and stirred after the impregnation of the first metal salt. The activated carbon was soaked in solutions having various concentrations of metal salts as provided in Table 6. Service life tests for $CCl_4$, $Cl_2$, HCN, and $SO_2$ were conducted according to CEN, EN 141, class 1 standards; however, the HCN test was performed at a doubled air flow rate to accelerate the test. Service life testing for $H_2S$ was conducted according to NIOSH protocol (see C. Coffey, $H_2S$ Test Procedures for Escape Gas Masks and Chemical Cartridge Respirators, Air Purifying Respirator Section Test Procedures, Dept. Health & Hum. Serv. (May 1985, revised Dec. 2, 1987). The service life test results are set forth in Table 7.

EXAMPLE 74

Comparative—Single Impregnation

The test sample of this Example was prepared and tested according to Example 2, except a lesser amount of zinc acetate was employed in the solution. Test results are shown in Table 7.

TABLE 7

| Example | Wt. % $ZnAc_2$ in Solution | Wt. % $K_2CO_3$ in Solution | Challenge Vapor | Service Life (Min.) |
|---|---|---|---|---|
| 49 | 6 | 16 | $CCl_4$ | 105 |
| 50 | 6 | 30 | $CCl_4$ | 102.5 |
| 51 | 16 | 16 | $CCl_4$ | 101.5 |
| 52 | 16 | 30 | $CCl_4$ | 98 |
| 53 | 11 | 23 | $CCl_4$ | 128.5 |
| 54 | 6 | 16 | $Cl_2$ | 216 |
| 55 | 6 | 30 | $Cl_2$ | 116 |
| 56 | 16 | 16 | $Cl_2$ | 203.5 |
| 57 | 16 | 30 | $Cl_2$ | 101.5 |
| 58 | 11 | 23 | $Cl_2$ | 136.5 |
| 59 | 6 | 16 | HCN | 50 |
| 60 | 6 | 30 | HCN | 45.5 |
| 61 | 16 | 16 | HCN | 42.5 |
| 62 | 16 | 30 | HCN | 63 |
| 63 | 11 | 23 | HCN | 66.5 |
| 64 | 6 | 16 | $H_2S$ | 112 |
| 65 | 6 | 30 | $H_2S$ | 153.8 |
| 66 | 16 | 16 | $H_2S$ | 50 |
| 67 | 16 | 30 | $H_2S$ | 101 |
| 68 | 11 | 23 | $H_2S$ | 116 |
| 69 | 6 | 16 | $SO_2$ | 99 |
| 70 | 6 | 30 | $SO_2$ | 144.5 |
| 71 | 16 | 16 | $SO_2$ | 88 |
| 72 | 16 | 30 | $SO_2$ | 129 |
| 73 | 11 | 23 | $SO_2$ | 133 |
| 74* | 3 | — | HCN | 12.5 |
| 75 | 3 | 16 | HCN | 28.3 |
| 76 | 3 | 10 | HCN | 24.3 |
| 77 | 3 | 5 | HCN | 15.3 |

*Comparative Example

The data set forth in Table 7 demonstrates that activated carbon impregnated with zinc acetate and potassium carbonate can remove a variety of gaseous contaminants from air at various impregnation levels. The data also demonstrates that better service lives are obtained when the activated carbon is soaked in a zinc acetate solution that contains greater than 3 weight percent of the metal salt. In general, better results are obtained when the potassium carbonate concentration in solution is kept below 30 weight percent.

EXAMPLE 78

Coal-Based Activated Carbon

In this Example a coal-based activated carbon was impregnated, first with cobalt acetate and then with potassium carbonate. The procedure outlined in Examples 49–73 and 75–77 was followed. The coal-based activated carbon was CECA G 12×20 mesh obtained from Atochem North America, Ceca Division, Pryor, Okla. There was 10% (weight/volume) percent of cobalt acetate in the first solution to which the activated carbon was soaked and there was 23 weight percent of potassium carbonate in the second solution to which the activated carbon was soaked. The dual-impregnated, coal-based activated carbon was tested for HCN service life using CEN EN-141, class 1 standards, at a double flow rate. A service life of 62 minutes was observed. The results of this Example demonstrate that dual impregnated, coal-based activated carbon provides good HCN removal.

EXAMPLE 79

Order of Impregnation Reversed

In this Example, activated carbon was first impregnated with potassium carbonate and was then impregnated with cobalt acetate. Ceca G 12×20 carbon (550 g) was soaked in a 23 weight percent solution of potassium carbonate, the excess solution was removed, and the carbon was dried until less than 2 weight percent water remained on the carbon. A 12.5 percent (weight/volume) solution of cobalt acetate was made by dissolving 211 g of cobalt acetate tetrahydrate in 1200 mL water. The potassium carbonate treated Ceca G activated carbon was then added to the cobalt acetate solution and was allowed to soak for 30 minutes. The carbon was then filtered via a buchner funnel and dried in a 100° C. oven for 16 hours.

During the cobalt acetate impregnation step, a precipitate was observed and when the carbon was filtered with the buchner funnel, a cloudy slurry was observed. This slurry caused difficulty in filtering. Upon drying, the carbon itself was very dusty with a purple colored material. A service life of 7 minutes was observed when the sample was tested for HCN service life according to CEN EN 141, class 1 standards at a doubled flow rate. The results of this Example demonstrate that improved results are obtained when the Group 6–12 metal salt is impregnated onto the activated carbon before the Group 1 metal carbonate salt.

Various modifications and alterations of this invention will become apparent to those skilled in the art without departing from the scope and spirit of this invention. It therefore should be understood that this invention is not to be unduly limited to the illustrated embodiments set forth above but is to be controlled by the limitations set forth in the claims and any equivalents thereof.

What is claimed is:

1. A dual-impregnated activated carbon composition capable of removing gaseous contaminants from a fluid, which composition consists essentially of:
activated carbon impregnated with at least one first metal salt and at least one second metal salt, the at least one first metal salt containing a Group 6–12 metal and the at least one second metal salt being a metal carbonate containing a Group 1 metal, wherein the molar ratio on the activated carbon of the Group 1 metal or metals of the at least one second metal salt to the Group 6–12 metal or metals of the at least one first metal salt is 1 or greater.

2. The dual-impregnated activated carbon composition of claim 1, wherein the Group 6–12 metal or metals is present on the activated carbon at at least 0.5 weight percent and the Group 1 metal or metals is present on the activated carbon at at least 1 weight percent, based on the weight of the activated carbon impregnated with the at least one Group 6–12 metal salt and the at least one Group 1 metal carbonate salt and dried.

3. The dual-impregnated activated carbon composition of claim 2, wherein the Group 6–12 metal or metals is present on the activated carbon in the range of 1 to 10 weight percent and the Group 1 metal or metals is present on the activated carbon at 2.5 to 20 weight percent, based on the weight of the activated carbon impregnated with the at least one Group 6–12 metal salt and the at least one Group 1 metal carbonate salt and dried.

4. The dual-impregnated activated carbon composition of claim 2, wherein the combined weight percent of the Group 6–12 metal or metals and the Group 1 metal or metals on the activated carbon is at least 3 weight percent, based on the weight of the activated carbon impregnated with the at least one Group 6–12 metal salt and the at least one Group 1 metal carbonate salt and dried.

5. The dual-impregnated activated carbon composition of claim 4, wherein the combined weight percent of the Group 6–12 metal or metals and the Group 1 metal or metals on the activated carbon is in the range of 3.5 to 40 weight percent, based on the weight of the activated carbon impregnated with the at least one Group 6–12 metal salt and the at least one Group 1 metal salt and dried.

6. The dual-impregnated activated carbon composition of claim 1, wherein the molar ratio of the Group 1 metal or metals to the Group 6–12 metal or metals is in the range of 2 to 15.

7. The dual-impregnated activated carbon composition of claim 6, wherein the at least one Group 6–12 metal salt contains zinc, and the Group 1 metal carbonate salt is selected from the group consisting of potassium carbonate, rubidium carbonate, or a combination thereof.

8. The dual-impregnated activated carbon composition of claim 1, wherein the activated carbon has been impregnated in sequence first with the at least one first metal salt and then with the at least one second metal salt.

9. A method of removing gaseous contaminants from a gaseous fluid, which method comprises:
contacting a fluid that contains a gaseous contaminant with the dual-impregnated activated carbon of claim 1.

10. The method of claim 9, wherein the gaseous contaminant is selected from the group consisting of carbon tetrachloride, sulfur dioxide, chlorine, hydrogen sulfide, hydrogen cyanide, hydrogen chloride, and hydrogen fluoride.

11. The method of claim 10, wherein the gaseous contaminant is hydrogen cyanide.

12. The method of claim 9, wherein the activated carbon has been impregnated first with zinc acetate and then with potassium carbonate.

13. The dual-impregnated activated carbon composition of claim 1, wherein the Group 6–12 metal salt has as an anionic species a carboxylate, a substituted carboxylate, a conjugate base of an inorganic acid, or a combination thereof.

14. The dual-impregnated activated carbon composition of claim 13, wherein the conjugate base of an inorganic acid is a sulfate, nitrate, or halide.

15. The dual-impregnated activated carbon composition of claim 13, wherein the Group 6–12 metal salt is selected from the group consisting of: zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc proponate, copper proponate, nickel proponate, cobalt proponate, iron proponate, manganese proponate, cadmium proponate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, zinc sulfate, copper sulfate, nickel sulfate, cobalt sulfate, iron sulfate, manganese sulfate, cadmium sulfate, and combinations thereof.

16. A dual-impregnated activated carbon composition capable of removing gaseous contaminants from a fluid, which composition consists essentially of:
activated carbon impregnated with at least one first metal salt and at least one second metal salt, the at least one first metal salt containing a Group 6–12 metal and an anionic species selected from the group consisting of a carboxylate, a substituted carboxylate, a conjugate base of an inorganic acid, or a combination thereof, and the at least one second metal salt being a metal carbonate containing a Group 1 metal, wherein the molar ratio on the activated carbon of the Group 1 metal or metals of the at least one second metal salt to the Group 6–12 metal or metals of the at least one first metal salt is 1 or greater.

17. The dual-impregnated activated carbon composition of claim 16, wherein the Group 6–12 metal or metals is present on the activated carbon in the range of 1 to 10 weight percent and the Group 1 metal or metals is present on the activated carbon at 2.5 to 20 weight percent, based on the weight of the activated carbon impregnated with the at least one Group 6–12 metal salt and the at least one Group 1 metal carbonate salt and dried.

* * * * *

UNITED STATES PATENT AND TRADEMARK OFFICE
CERTIFICATE OF CORRECTION

PATENT NO. : 5,344,626
DATED : September 6, 1994
INVENTOR(S) : Mary Jo Abler

It is certified that error appears in the above-indentified patent and that said Letters Patent is hereby corrected as shown below:

On the Cover Page, in the Abstract, line 4, "activate" should be --activated--.

Col. 11, line 18, after "metal" insert a comma.

Signed and Sealed this

Third Day of January, 1995

*Attest:*

BRUCE LEHMAN

*Attesting Officer*   *Commissioner of Patents and Trademarks*